(12) United States Patent
Stickle et al.

(10) Patent No.: US 10,705,945 B1
(45) Date of Patent: Jul. 7, 2020

(54) COMPUTING SYSTEM TESTING SERVICE

(71) Applicant: Amazon Technologies, Inc., Reno, NV (US)

(72) Inventors: Thomas Charles Stickle, Saint James, NY (US); Michael Charles Pfeiffer, Pleasanton, CA (US); Karthikeyan Krishnan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 14/494,031

(22) Filed: Sep. 23, 2014

(51) Int. Cl.
*G06F 9/44* (2018.01)
*G06F 11/36* (2006.01)
*G06F 9/50* (2006.01)

(52) U.S. Cl.
CPC ............ *G06F 11/3688* (2013.01); *G06F 9/50* (2013.01)

(58) Field of Classification Search
None
See application file for complete search history.

(56) References Cited

U.S. PATENT DOCUMENTS

| | | | | |
|---|---|---|---|---|
| 2005/0120347 A1* | 6/2005 | Asare | ................ | G06F 8/61 717/177 |
| 2006/0205397 A1* | 9/2006 | So | ................ | H04M 1/24 455/423 |
| 2006/0265172 A1* | 11/2006 | Basham | ................ | G06F 11/26 702/117 |
| 2007/0169195 A1* | 7/2007 | Anand | ................ | H04L 63/1416 726/23 |
| 2011/0063093 A1* | 3/2011 | Fung | ................ | G06Q 10/06 340/10.52 |
| 2011/0258692 A1* | 10/2011 | Morrison | ................ | G06F 21/53 726/11 |
| 2012/0159506 A1* | 6/2012 | Barham | ................ | G06F 9/5044 718/104 |
| 2013/0198386 A1* | 8/2013 | Srikanth | ................ | G06F 9/5061 709/226 |
| 2014/0196044 A1* | 7/2014 | Fernando | ................ | G06F 9/5027 718/102 |
| 2014/0289793 A1* | 9/2014 | Moloian | ................ | H04L 63/20 726/1 |
| 2014/0310603 A1* | 10/2014 | Flavel | ................ | H04L 41/0806 715/735 |
| 2014/0330974 A1* | 11/2014 | Labocki | ................ | H04L 47/70 709/226 |

* cited by examiner

*Primary Examiner* — Qamrun Nahar
(74) *Attorney, Agent, or Firm* — Davis Wright Tremaine LLP

(57) ABSTRACT

A plurality of computing resources are provisioned for a plurality of computing system elements based at least in part on input specification information, whereby the input specification specifies the plurality of computing resources. The plurality of computing resources include one or more computing resources of a first computing system element of the plurality of computing system elements that are provided for a second computing system element of the plurality of computing system elements. The plurality of computing system elements are evaluated to identify whether the plurality of computing system elements are successfully executed and a report is generated based at least in part on the evaluation.

22 Claims, 9 Drawing Sheets

Input Specification: 502

Declarations of Computing System Elements: 504

| Ref ID | Name | URL |
|---|---|---|
| 001 | 1st AA Server | example.com/AA1/AA1.declaration |
| 002 | 2nd AA Server | example.com/AA2/AA2.declaration |
| 003 | Relational Database System | example.com/RDS/RDS.declaration |
| 004 | 1st Desktop Gateway | example.com/DG1/DG1.declaration |
| 005 | 2nd Desktop Gateway | example.com/DG2/DG2.declaration |

List of Tracked Parameters: 506

| Ref ID | Identity |
|---|---|
| 001 | First DMZ Subnet |
| 001 | Second DMZ Subnet |
| 001 | First Private Subnet |
| 001 | Second Private Subnet |
| 001 | Security Group |

List of Declaration Input Parameters: 508

| Ref ID | Parameter Identity | Parameter Value |
|---|---|---|
| 001 | Computer System Key Pair Name | (Declaration-specified) |
| 003 | First Failover Cluster Subnet | First Private Subnet |
| 003 | Second Failover Cluster Subnet | Second Private Subnet |
| 004 | First Desktop Gateway Subnet | First DMZ Subnet |
| 005 | Second Desktop Gateway Subnet | Second DMZ Subnet |

FIG. 5

COMPUTING SYSTEM TESTING SERVICE

BACKGROUND

The use of network computing and storage has proliferated in recent years. The resources for network computing and storage are often provided by computing resource service providers who leverage large-scale networks of computers, servers and storage drives to enable customers, including organizations of various sizes, to host and execute a variety of applications and web services. Customers, who traditionally used on-site servers and storage equipment to host their websites or provide enterprise services to their organizations and employees, often forego on-site hosting and storage and turn to using the resources of the computing resource providers. The usage of network computing allows customers to efficiently and adaptively satisfy their computing needs, whereby the computing, storage and resources may be added or removed from a large pool provided by a computing resource provider on an on-demand basis.

Customers of a computing resource service provider often utilize the resources of the service provider to create complex distributed system architectures, with a complex set of dependencies. At the same time, individual components of a distributed system are often updated for various reasons and such updates can create issues with the management of such complex systems. It is often challenging to enable testing computing systems having a plurality of elements before the runtime execution of the computing systems. It is also challenging to perform the testing when interdependencies between the plurality of computing system elements exist.

BRIEF DESCRIPTION OF THE DRAWINGS

Various embodiments in accordance with the present disclosure will be described with reference to the drawings, in which:

FIG. 5 shows an example of an input specification provided to a test automation engine in accordance with at least one embodiment;

DETAILED DESCRIPTION

Figure 1:
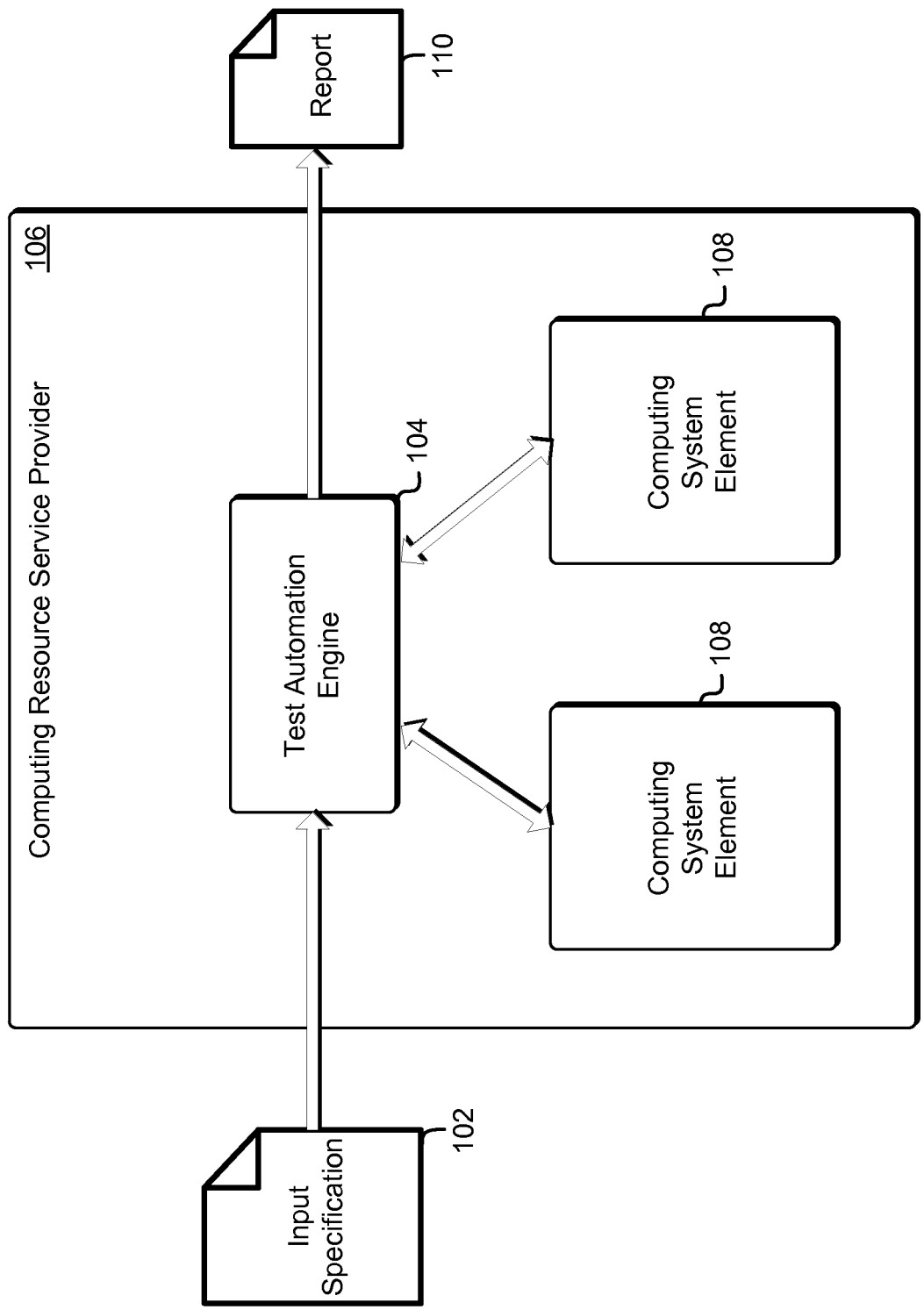
FIG. 1 shows an example of an environment for testing computing system elements in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include input specification-based testing of computing system elements. A computing system may be a distributed system comprising a plurality of elements including, for example, an authentication and authorization server, a desktop gateway or a relational database management system, among others. The computing system and associated elements may be utilized using underlying computing resources provisioned by a remote computing resource service provider. For example, the computing system may be used by a customer that is an organization for managing enterprise informational technology solutions for the organization.

The computing resources of the computing system may be provisioned by submitting computing system declarations to the computing resource service provider. The computing system declarations may specify, for each computing system element, the attributes associated with the computing resources to be provisioned. For example, the computing resources may include instantiated servers, databases, data stores or routers among other network infrastructure. The computing system declarations may specify the types, number, computational power or storage space of the computing resources, among others. Further, the computing system declarations may specify the linkage or connectivity between the resources.

The computing system elements may be sought to be tested prior to the runtime execution of the computing system. The testing may include determining whether a computing system element operates as intended, whereby, for example, upgrades or updates to the computing system element may cause the element to malfunction. For example, it may be desirable to determine whether the elements of the computing system are successfully executed prior to utilizing the computing system to service an organization. Accordingly, the computing system declarations may be provided to a testing entity as part of input specification data as described herein. The testing entity may be a computer system configured to cause the computing resources of the computing system element to be provision and monitor the computing system element to determine whether the computing system element is successfully executed.

Further, the input specification data may also indicate dependencies between the computing system elements. The input specification data may, for example, indicate whether computing resources of a first computing system element are used by a second computing system element. Accordingly, when testing the second computing system element, the computing resources may be made available for use by the second computing system element.

Following providing the input specification data to the testing entity, the testing entity may evaluate each computing system element. For example, the testing entity may cause the computing resources to be provisioned per the input specification data. Causing the computing resources to be provisioned may include making an application programming to a service that is configured to provision the computing resources. Further, the testing entity may monitor the execution of the computing system element to determine whether one or more criteria specifying successful execution of the computing system element are met. In addition, attributes of computing resources of the computing system element, such as subnet addresses, may be tracked and used in provisioning computing resources of a dependent or subsequently tested computing system element.

FIG. 1 shows an example of an environment for testing computing system elements in accordance with at least one embodiment. An input specification 102 is provided to a test automation engine 104 of a computing resource service provider 106. The input specification 102 may specify computing resources to be provisioned for a plurality of computing system elements 108. For instance, the input specification may comprise information (and/or a reference to information) that is sufficient to, for each of the computing resources, determine a set of parameters for an application programming interface call to a service to cause the service to provision the computing resource. Further, the input specification 102 may specify dependencies between the computing system elements 108. For example, for a first computing system element to be run, provisioned resources of a second computing system element may be required to be provided to the first computing system element.

Upon receiving the input specification 102, the test automation engine may test the computing system elements 108 independently. For example, the test automation engine may provision the underlying computing resources for each computing system element 108 based at least in part on the input specification 102, thereby creating a distributed system in accordance with the input specification. Further, the test automation engine 102 may evaluate the execution of the computing system elements 108. For example, evaluating the execution of the computing system elements 108 may include determining whether one or more specified criteria for successful execution are met. The test automation engine 102 may then generate a report 110 indicating whether the computing system elements 108 were successfully executed. The report 110 may be provided to a customer (i.e., to a computing device associated with the customer) requesting the provisioning of the computing resources or to an administrator of the computing resource service provider 106, among others. An email service of the computing resource service provider 106 may be used to email the report (for example, to the administrator). The results of the computing system elements 108 may be included in the email. Alternatively, a link, such as a uniform resource location (URL), to the report may be included in the email.

Figure 2:
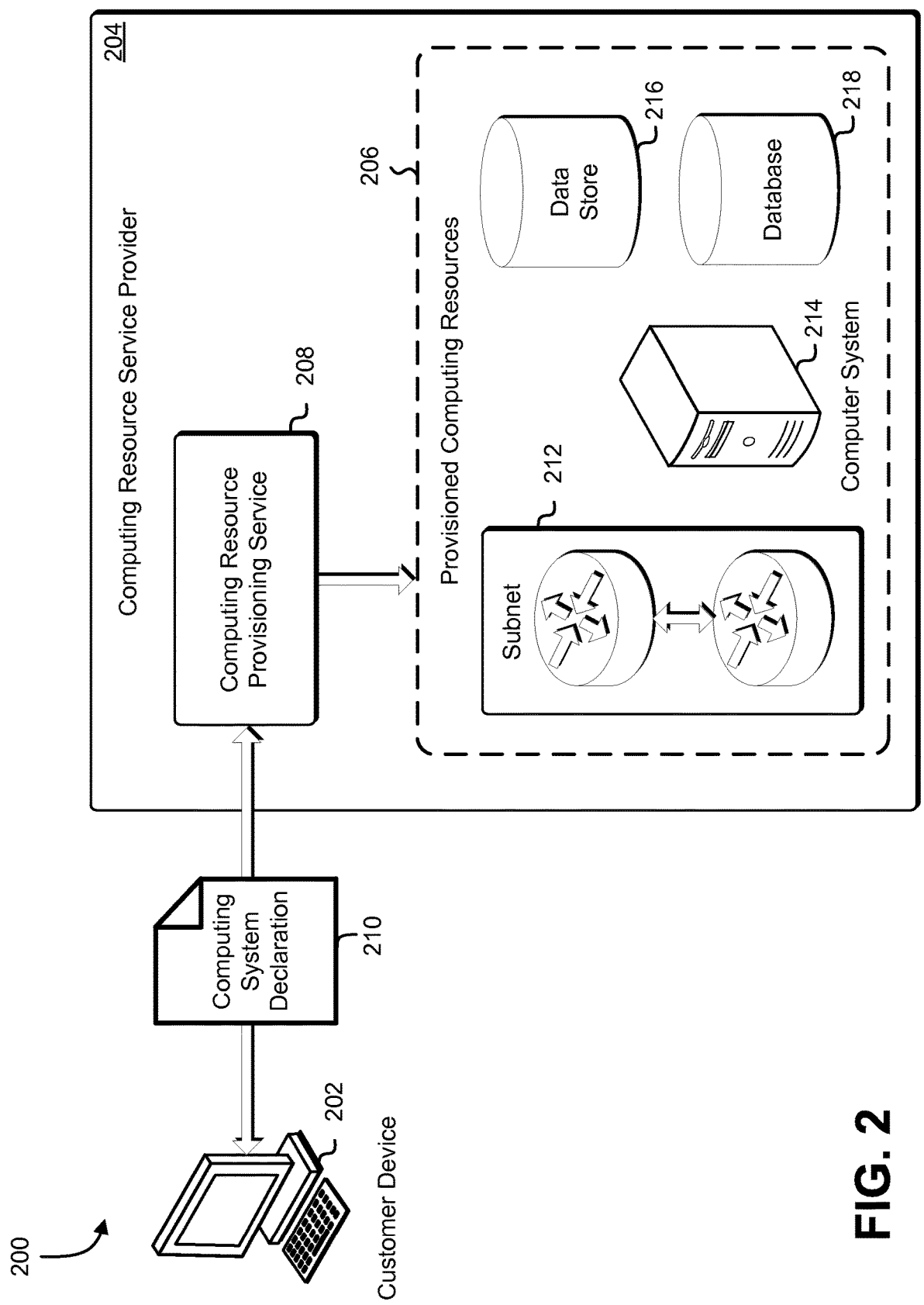
FIG. 2 shows an example of an environment for provisioning computing resources by a computing resource service provider in accordance with at least one embodiment.

FIG. 2 shows an example of an environment 200 for provisioning computing resources by a computing resource service provider 204 in accordance with at least one embodiment. In the environment 200, a customer device 202 is shown to be in communication with and the computing resource service provider 204. The customer device 202 may be any type of computing device, such as a personal computer, server, among others. Further, the customer device 202 may be operated by an administrator of an organization or a developer, among others. The customer device 202 may be used to request provisioning computing resources 206 of the customer by the computing resource service provider 204. Further, the customer device 202 may also be used to configure the provisioned computing resources 206. As described herein, the provisioned computing resource 206 may include computer systems, such as servers or hosts, databases, data stores or sub networks (also referred to as subnets). Configuring the provisioned computing resources 206 may include setting the computational power of a computer system, for example, as measured by central processing unit (CPU) clock cycles or the like. Furthermore, configuring the provisioned computing resources 206 may include specifying Internet protocol (IP) addresses of the subnets, among others.

The computing resource service provider 204 includes a computing resource provisioning service 208. The computing resource provisioning service 208 may comprise a collection of computing resources collectively configured as a distributed system to provide a web service or other application programming interface including a browser-based management console. The management console may be used to request the provisioning of computing resources for the customer. The computing resource provisioning service 208 may create (or delete) the computing resources 206 together as a unit, whereby the computing resources 206 may be used to execute an application. The computing resources 206 may be provisioned on-demand or as requested from existing services of the computing resource service provider 204. As described herein, the computing resource service provider 204 may include a virtual computer system service that enables the instantiation of a virtual computer system for a customer. Further, the computing resource service provider 204 may include a storage service or a database service that enable providing a data store or a database, respectively.

The customer device 202 may send a computing system declaration 210 to the computing resource provisioning service 208. The computing system declaration 210 may be a document, such as an object-oriented language text file including JavaScript Object Notation (JSON), among others. The computing system declaration 210, which may be a template, may specify the computing resources 206 to be provisioned for a computing system and attributes of the computing resources 206. For example, the computing system declaration 210 may specify a certain type of host or server to be provisioned as well as a size of a database that is to be made available to the host or server. Upon receiving the computing system declaration 210, the computing resource provisioning service 208 may provision the computing resources 206 as a unit. The computing system declaration 210 may obviate the need for requesting that the computing resources 206 be provisioned independently. Further, the computing system declaration 210 may specify dependencies or links between the computing resources 206. The computing resources 206 may be provisioned using services of the computing resource service provider 204, whereby provisioning the computing resources 206 may include allocating the computing resources 206 to the customer and configuring the computing resource in accordance with the received declaration 210. Although a computing resource provisioning service 208 is described herein for provisioning the computing resources 206, in various embodiments any service that enables application modeling, deployment, configuration, or management may be used.

In the environment 200 of FIG. 2, the provisioned the computing resources 206 include one or more subnets 212, a computer system 214, a data store 216 and a database 218. The one or more subnets 212 may be in various network zones, whereby each network zone may correspond to a geographic region and may be optimized to service data traffic originating from devices having a proximity to the geographic zone. A set of datacenters that host the resources for one zone may be different from another set of data centers that host another zone. Furthermore, private or public routes and Internet protocol (IP) addresses may be configured for each subnet 212. The computer system 214 may be a virtual computer system that is used to execute an application, such as an application that authenticates and authorizes users and computers in a network assigns and enforces security policies. Further, the data store 216 and database 218 may be used to store data associated with the application executed on the computer system 214. A customer that is an organization may request that the computing resources 206 to be provisioned, for example, to execute an application that enables networking workplace printers, among other applications.

Figure 3:
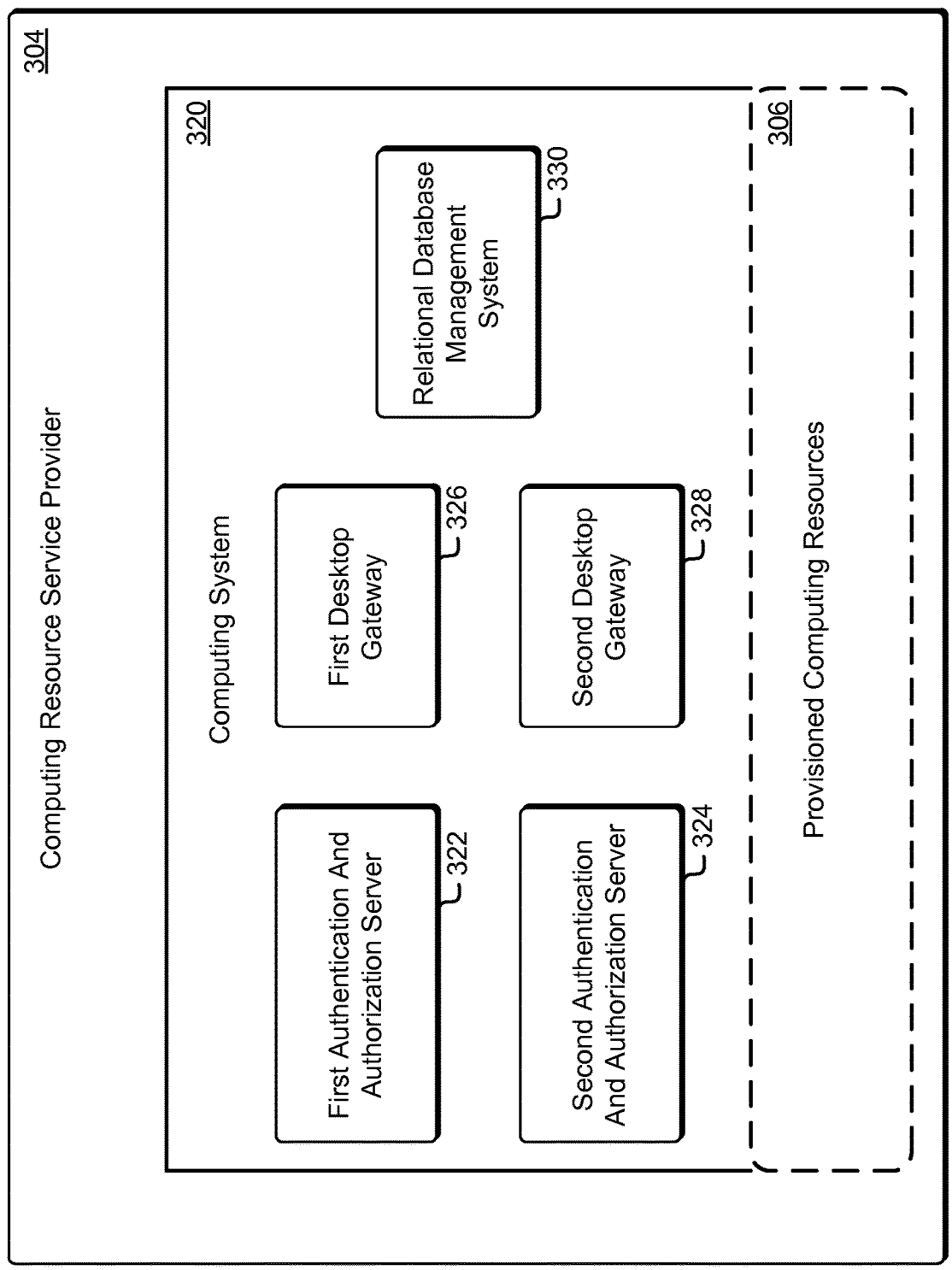
FIG. 3 shows an example of a computing system executed on provisioned computing resources of a computing resource service provider in accordance with at least on embodiment.

FIG. 3 shows an example of a computing system executed on provisioned computing resources of a computing resource service provider in accordance with at least on embodiment. The computing resource service provider 304, which may be the computing resource service provider described with reference to numeral '204' in FIG. 2, is used to provision underlying computing resource 306 for the computing system. As described with reference to FIG. 2, the provisioned computing resources 306 may include one or more computer systems, databases, data stores or networking resources, among others. The underlying provisioned computing resources 306 are used to execute a computing system 320 having a plurality of elements. The computing system 306 elements include a first authentication and authorization server 322, a second authentication and authorization server 324, a first desktop gateway 326, a second desktop gateway 328 and a relational database management system 330. An element of the computing system 320 may be any portion of the computing system 320, such as an application of a computing system having a plurality of applications.

The computing system 320 may be used to establish an information technology infrastructure of an organization, such as a corporation. The organization may, for example, forego the establishment of on-premises servers or databases and the like for providing their information technology infrastructure. Instead, the organization may use remote or network-based computing resources for connecting their employees. The remote resources are advantageous in that that may are scalable and may be provisioned on an on-demand basis. For example, as the organization grows in terms of the number of users or connected devices, more computing resources 306 may be provisioned to allow for increasing the size of the computing system 320 used to service the users and devices.

The authentication and authorization servers 322, 324 may be used to authenticate and authorize users and devices in a network. Further, the authentication and authorization servers 322, 324 may be configured to assign and enforce security policies for all devices and as well as installing or updating software that is executed on the devices. For example, upon a user log in to a computer that is part of a domain controlled by the authentication and authorization servers 322, 324, the authentication and authorization servers 322, 324 may be configured to determine whether the user is a system administrator or conventional device user. The authentication and authorization servers 322, 324 may utilize the provisioned database 218 and computer system 214 described with reference to FIG. 2 for providing services to the organization. Each authentication and authorization server 322, 324 may be provided to service requests in a regional availability zone, whereby, the regional availability zone may be a network optimally configured to service requests originating from within the proximity of the regional availability zone. Similarly, the first desktop gateway 326 and the second desktop gateway 328 may be servers that enable authorized users to connect to remote computers on an organization's network from a device having a network connection. The desktop gateways 326, 328 may use a protocol, such as a remote desktop protocol (RDP) or hypertext transfer protocol secure (HTTPS), to enables secure or encrypted communications. Similar to the authentication and authorization servers 322, 324, two desktop gateways 326, 328 may be provided to service users in two different regional availability zones. The relational database management system 330 may be an application that is configured to store data in the database 218 and retrieve the data from the database 218. The retrieval and placement of data may be made in response to requests made by the authentication and authorization servers 322, 324 or the two desktop gateways 326, 328. It is noted that the computing system 320 and associated elements 322-330 are exemplary and in various embodiments different elements including servers or systems may be used.

The computing system declaration 210 described with reference to FIG. 2 may be used to specify the computing system 320 sought to be launched by the customer. For example, for each element 322-330 of the computing system 320, the computing system declaration 210 may include a specification of the underlying computing resources 306 required to be provisioned for the computing system 320 or associated element 322-330 to be operational. For example, for the first desktop gateway 326, the computing system declaration 210 may specify attributes of a computer system required to be provisioned to execute the first desktop gateway 326. The attributes may include the computational power, for example, CPU power, of the computer system as well as whether the computational resources may be increased if a specified usage threshold is exceeded. In addition, the declaration may specify parameters associated with the provisioned computing resource 306, such as a unique name or identifier of each resource or their port or network addresses. The declaration may also specify a computer system image to be used when launching the computer system, whereby, the image may specify an operating system of the computer system, applications that are executed on the computer system, an architecture (for example, 32-bit or 64-bit) of the computer system, permissions for accessing the computer system or attributes of a storage volume of the computer system including a storage size or a boot time of the storage volume.

Usage of the computing system declaration 210 is advantageous in that standardized or model declarations may be constructed and repeatedly used by customers for launching common applications. For example, various organizations may use the same type of authentication and authorization server. Model declarations for the authentication and authorization server may be made available to customers (for example, as an object-oriented text file). The customers may utilize the model declarations to launch the authentication and authorization server having all the requisite underlying computing resources 306. A model declaration may only require slight modification to suit a customer's computing needs. For example, other than modifying port numbers or addresses, a customer may utilize the model declaration as provided to launch an application using provisioned resources.

When a plurality of computing system declarations are used to launch various computing systems elements, dependencies or linkages between the computing systems elements may influence or affect the operation of these elements. For example, a declaration for a first computing system element may specify that a particular subnet of a second computing system element be available for use by the first computing system element. If the subnet of the second computing system element is not made available to the first computing system element, execution of the second computing system element may fail. Accordingly, testing that the computing system 320 is may be properly executed using the provisioned computing resources 306 may require testing the computing system declarations and dependencies between the declarations.

Figure 4:
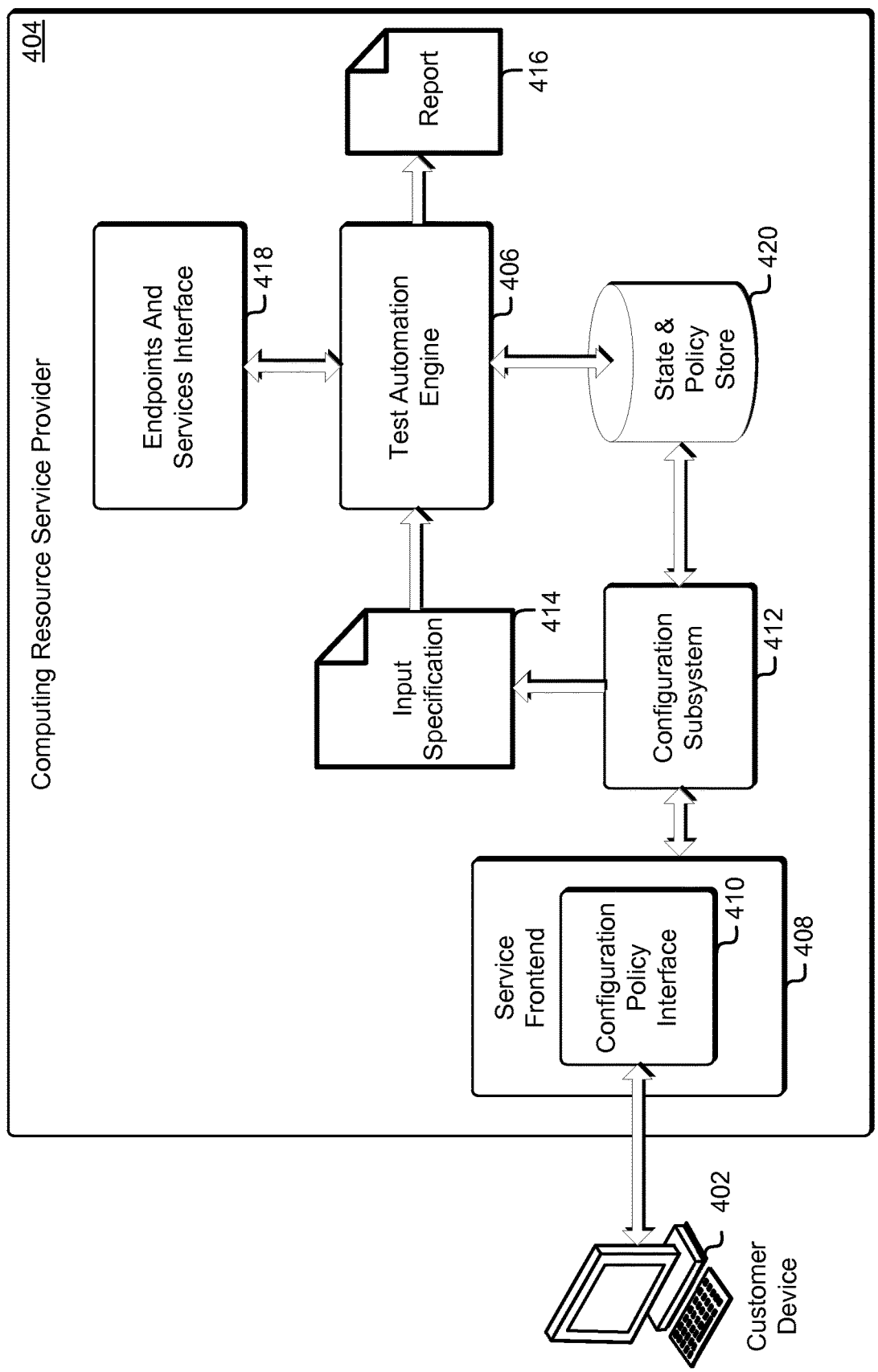
FIG. 4 shows an example of an environment for automatically testing a computing system in accordance with at least one embodiment.

FIG. 4 shows an example of an environment 400 for automatically testing a computing system in accordance with at least one embodiment. In the environment 400, a customer device 402, such as the customer device 202 described with reference to FIG. 2, communicates with a computing resource service provider 404 that includes a test automation engine 406. The test automation engine 406 as described herein is configured to test computing system elements based at least in part on linkages or dependencies between the elements. The test may evaluate whether the computing system or associated elements may malfunction or not operate properly due at least in part to a configuration of the elements or dependencies between the elements. For example, the computing system element may be determined to have failed if required computing resources have not been provisioned. Further, if computing system element is used to execute a program or an application, evaluating the computing system element may include determining whether the program or the application produced a sought outcome.

The computing resource service provider 404 includes a service frontend 408, which may be an interface or a gateway, and enables the customer device 402 to communicate with the computing resource service provider 404. The service frontend 408 includes a configuration policy interface 410 that permits the customer to configure computing systems or elements thereof executed using resources provided by the computing resource service provider 404. The configuration policy interface 410 permits the customer to declare or specify the computing system, launch or terminate the computing system or establish policies regarding the testing of the computing system as described herein, among others. The declarations may be provided using the configuration policy interface 410 (for example, as a text file) or, alternatively, an address associated with the declarations may be provided. As described herein, the declarations may be model declarations provided for use by various customers, and the declarations may be identified using an address of a data store that stores the declaration or a uniform resource locator (URL), among others. The configuration policy interface 410 may also be used to specify parameters of the provisioned computing resources including subnet identities or addresses, security group identities or addresses or private network identities, among others. Further, the parameters may include unique identifiers of underlying instantiated virtual computer system of the computing resources, security setting for the computing resources or attributes of instantiated storage volumes, among others.

The computing system declarations are received by the configuration subsystem 412. The configuration subsystem 412, which may be any type of computer system, may be configured to generate an input specification 414 based at least in part on the computing system declarations and associated parameters and provide the input specification 414 to the test automation engine 406. The input specification 414, described with reference to FIG. 5 herein, may identify the declarations for a plurality of computing system elements and dependencies between the computing system elements. Further, for each computing system element, the input specification 414 may specify whether a computing resource or associated attributes are to be tracked during the testing of the computing system element. Tracking the computing resource or associated attributes may include determining whether the computing resource is available as well as determining whether one or more addresses associated with the computing resource. Further, for each computing system element, the input specification 414 may specify parameters that are to serve as in input to the computing system element or declaration thereof.

Following receipt of the input specification 414, the test automation engine 406 may cause each element of the computing system to be tested and generate based at least in part on the testing a report 416 that may be provided back to the customer. The report 416 may indicate whether the computer system elements were successfully launched or executed. To generate the report 416, the test automation engine 406 may cause each computing system element to be launched independently of other elements by, for example, instantiating the underlying computing resources for the computing system element. Further, launching the computing system element may include configuring input parameters in accordance with the input specification 414 or making requested resources available. Further, the attributes of parameters specified in the input specification 414 are tracked during the launching or execution of the computing system element. The test automation engine 406 communicates with an endpoint and services interface 418 to monitor the execution of the computing system elements. In various embodiments, a computing system element may be an application executed on a computer system that is instantiated using a virtual computer system service. The test automation engine 406 may use the endpoint and services interface 418 to communicate with the virtual computer system service to evaluate the execution of the computing system element and track parameters specified in the input specification 414.

The state and policy store 420 may be used to store a policy associated with the test performed by the test automation engine 406. For example, the policy may specify that execution of a computing system element id determined to be successful if an indication is received from a computing resource provisioning service, such as the computing resource provisioning service 208 described with reference to FIG. 2, indicating that the computing system element was successfully launched. Conversely, the policy may specify that the computing system element is determined to be successful if the test automation engine 406 determines (for example, by communicating with services via the endpoints and services interface 418) that the underlying computing resources were launched.

FIG. 5 shows an example of an input specification 502 provided to a test automation engine in accordance with at least one embodiment. The input specification 502 comprises a declaration of computing system elements 504, a list of tracked parameters 506 and a list of declaration input parameters 508. The declaration of computing system elements 504 includes, for each computing system element, a reference identity associated with the element as well as a name associated with the element. The declaration of computing system elements 504 also includes a URL of the declaration of the computing system element. Further, although not shown in FIG. 5, the declaration of computing system elements 504 may include an indication of whether computing system element is required to be running in order to test other elements of the computing system. For example, the first authentication and authorization server having a reference identity of 001 may be required to be executed in order for the remaining computing system elements to be tested. The URL may be used to locate the declaration and launch the computing system element in accordance with the declaration.

The list of tracked parameters 506 indicates for each computing system element an identity associated with a parameter that is sought to be tracked. As described herein, the parameter may be any computing resource and tracking the parameter may include determining or storing attributes associated with the computing resource. As shown in the example of FIG. 5, when the first authentication and authorization server is executed, the attributes of a first and a second demilitarized subnet are tracked. The demilitarized subnets may be logical subnetworks that contain or expose external-facing services (for example, of a server) to an untrusted network. Tracking the parameters of the demilitarized subnets may include tracking an address of the subnets. For each computing system element, the test automation engine 406 may track the parameters of the list 406 and store the parameters in the state and policy store 420. The stored parameters may be used as input variables in the execution and testing of other computing system elements.

The input specification 502 further includes a list of declaration input parameters 508 for the plurality of computing system elements. Some input parameters may be dependent upon tracked parameters of previously tested computing system elements. Further, other input parameters may be specified in a declaration of the computing system element and may, therefore, not depend on other computing system elements. As shown in FIG. 5, the first authentication and authorization server may have key pair name associated with an instantiated computer system that is declaration specified and not dependent upon the execution of another computing system element. Conversely, the relational database system having a reference identity of 003 has a first failover cluster subnet that is set to tracked first private subnet of the first authentication and authorization server. Accordingly, when testing the relational database system, which is dependent on the first authentication and authorization server, the first private subnet may be made available as the first failover cluster subnet.

Figure 6:
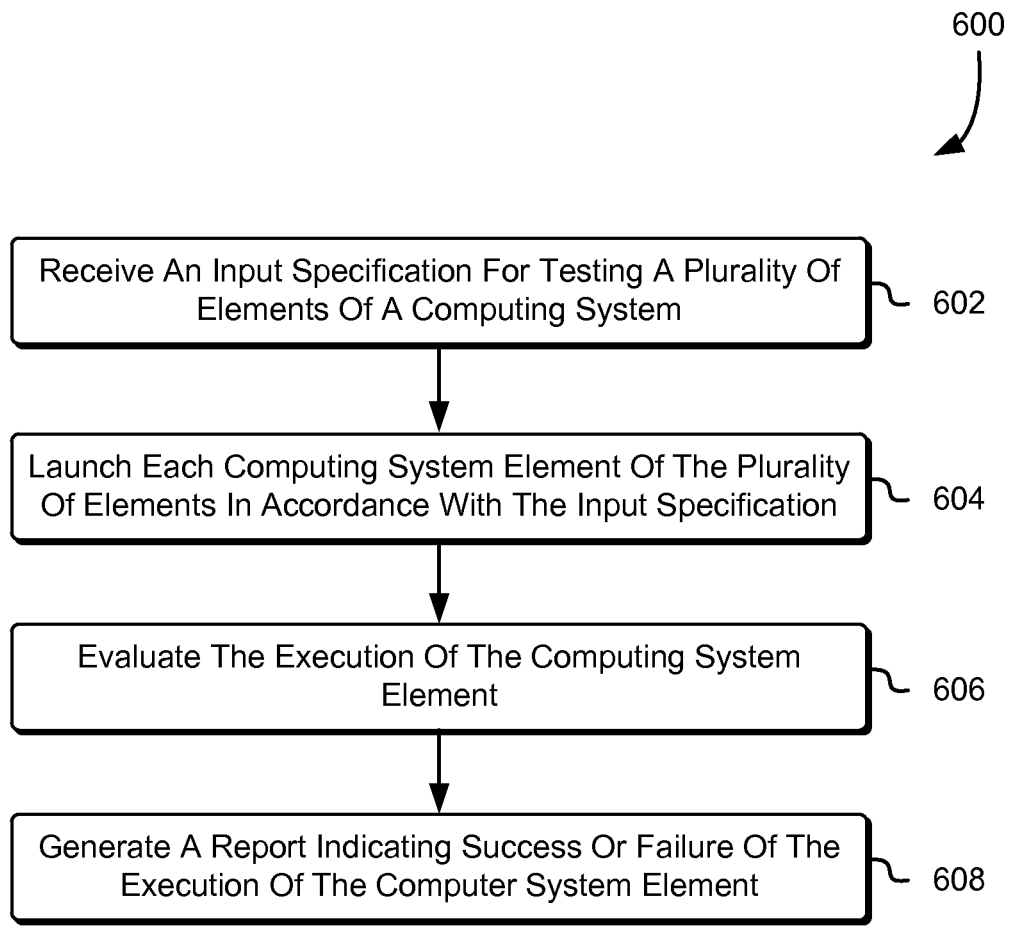
FIG. 6 shows an example of a method for testing a plurality of computing system elements in accordance with at least one embodiment.

FIG. 6 shows an example of a method for testing a plurality of computing system elements in accordance with at least one embodiment. In the process 600, a test automation engine, such as the test automation engine 406 described with reference to FIG. 4, receives 602 an input specification for testing a plurality of elements of a computing system. The test automation engine launches 604 each computing system element of the plurality of elements in accordance with the input specification. The test automation engine then evaluates 606 the execution of the computing system element. For example, evaluating the execution of the computing system element may be in accordance with a policy that specifies factors usable in determining whether the computing system element was successfully executed. For example, some types of execution failures may be tolerable per the policy, whereas others may cause an execution failure to be determined. Following evaluating the execution of the computing system element, computing resources associated with the computing system element may be terminated. The test automation engine then generates 608 a report indicating success or failure of the execution of the computer system element. The report may be delivered as an email message to a customer or an administrator, among others.

Evaluating a computing system element may include performing a health check on the computing system element. The health check may include evaluating a status of the computing system element and whether the computing system element is running (for example, executing). Further, performing the health check may include determining whether the computing system element is properly functioning. One or more specified criteria may be evaluated to perform the health check. A criterion may be deemed to be met if a measure ascertained by performing a test on the computing system element is found to be within a specified range. For example, performing the health check may include pinging a port of the computing system element to determine whether the port is available or responsive. A request or, in general, data, may be sent to the port, whereby if an acknowledgement is received, the criterion may be deemed to be met and if an acknowledgement is not received, the criterion may be deemed not to be met.

Figure 7:
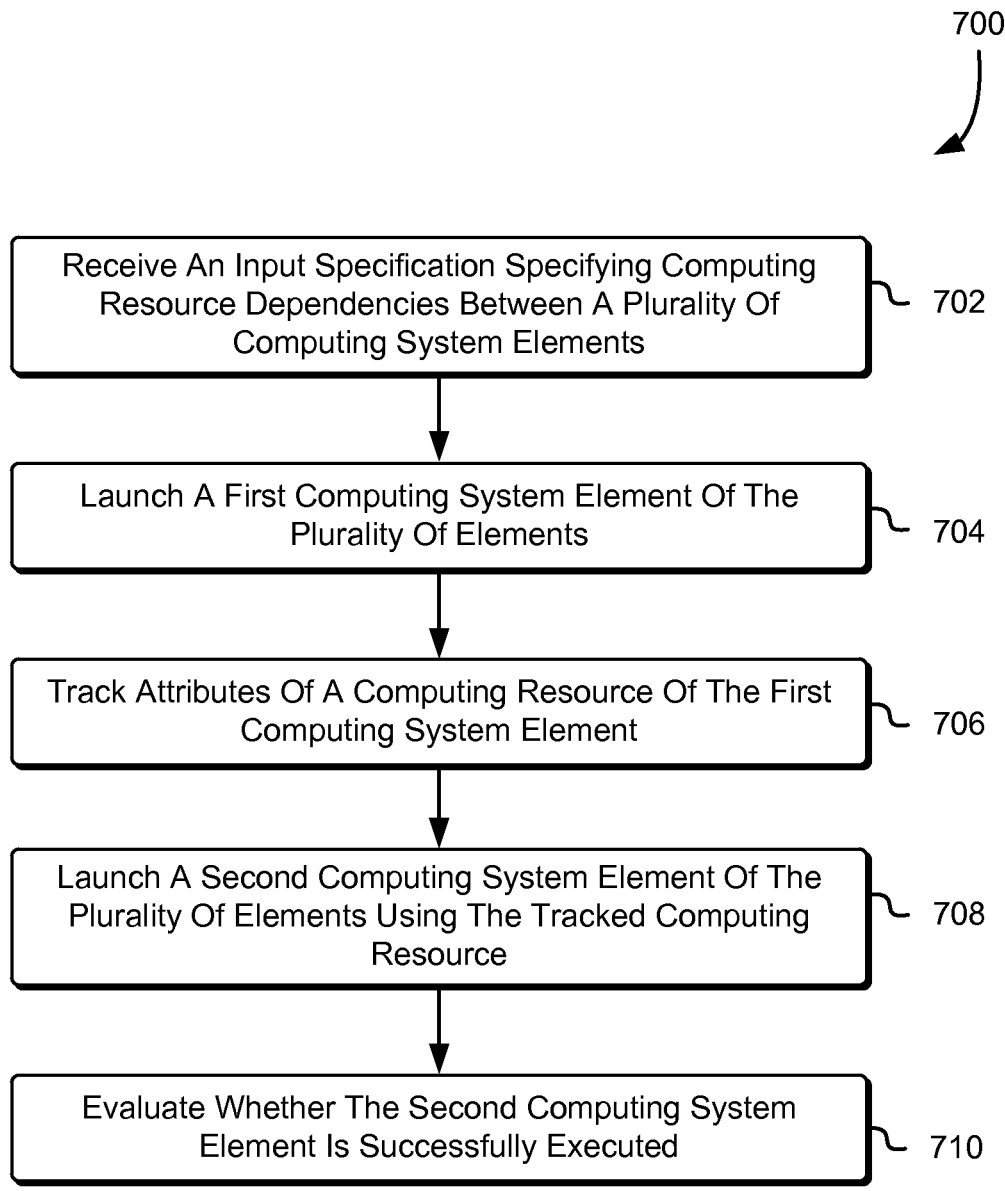
FIG. 7 shows an example of a method for testing a computing system element in accordance with at least one embodiment.

FIG. 7 shows an example of a method for testing a computing system element in accordance with at least one embodiment. In the process 700, a test automation engine, such as the test automation engine 406 described with reference to FIG. 4, receives 702 an input specification specifying computing resource dependencies between a plurality of computing system elements. For example, the computing resource dependencies may be included in the list of declaration input parameter 508 described with reference to FIG. 5. The test automation engine then launches 704 a first computing system element of the plurality of elements. Launching the first computing system element may include causing underlying computing resources to be provisioned for the first computing system element and used for executing the first computing system element.

The test automation engine then tracks 706 attributes of a computing resource of the first computing system element. The computing resource whose attributes are tracked may be identified in the input specification. Tracking the attributes of the computing resource may include retaining information usable for instantiating the computing resource. For example, if a subnet of the first computing system element is tracked, information indicating public or private addresses of the subnet may be retained as well as a size of the subnet. The test automation engine then launches 708 a second computing system element of the plurality of elements using the tracked computing resource. For example, execution of the second computing element may require that the computing resource, such as the subnet, of the first computing element be available for use. Accordingly, even if the second computing system element is dependent upon the first computing system element or associated computing resources, the two elements may be independently tested through the use of the input specification. Further, the computing resource may be a virtual computer system, whereby attributes of the virtual computer system may be used in provisioning storage volume of the second computing element. The test automation engine then evaluates 710 whether the second computing system element is successfully executed. Further, a report may be generated based at least in part on the evaluation.

Figure 8:
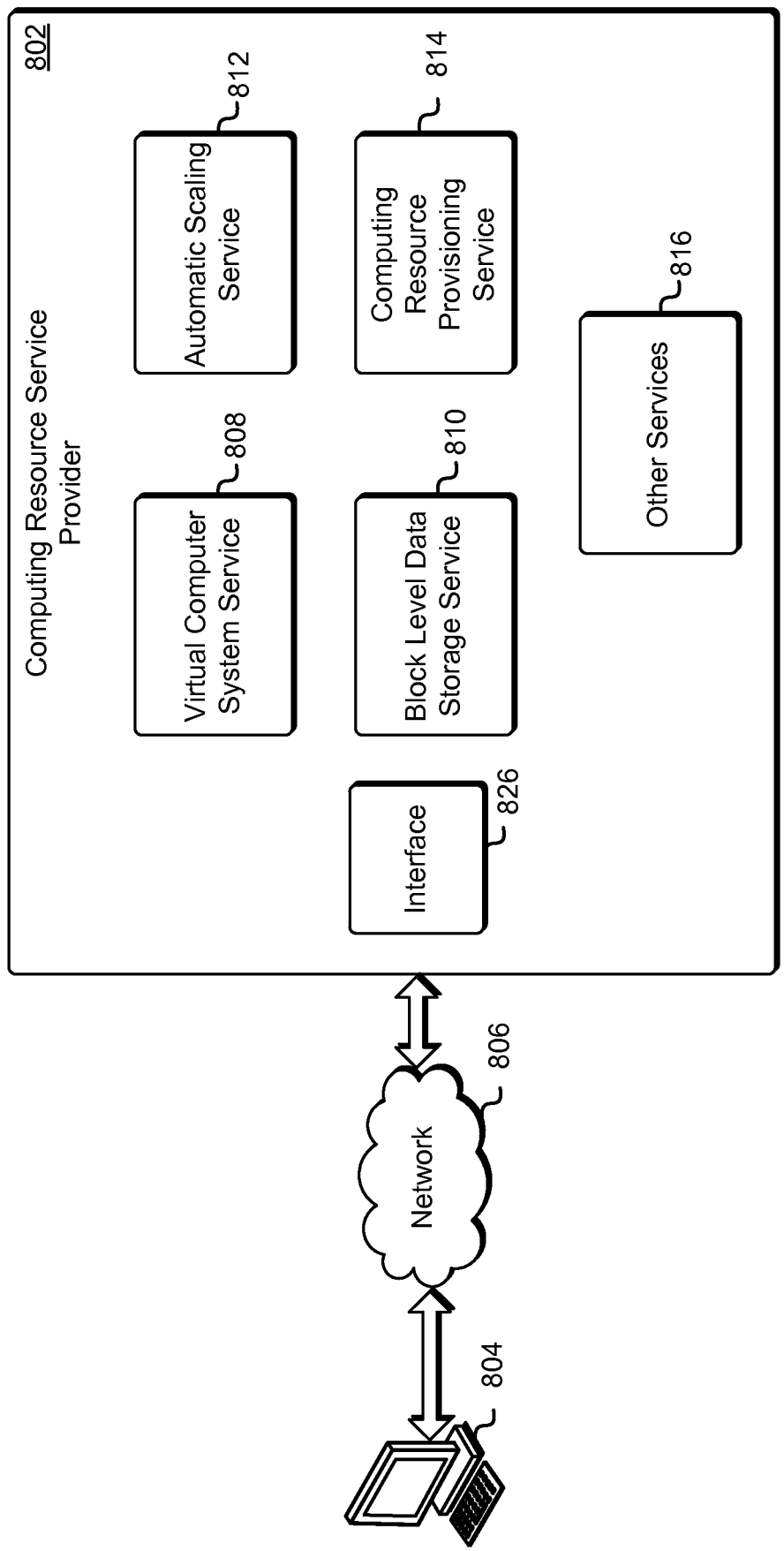
FIG. 8 shows an example of a customer connected to a computing resource service provider in accordance with at least one embodiment.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described herein or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described herein include the services 808-824 described with reference to FIG. 8 and additional services may be provided in addition to or as an alternative to services explicitly described herein. As described herein, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources collectively configured as a distributed system to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that are collectively configured as a distributed system to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 includes an automatic scaling service 812. The automatic scaling service 812 enables the customer 804 to dynamically adjust the resources used by or allocated to the customer 804 based at least in part on pre-defined conditions. The automatic scaling service 812 may permit the customer 804 to establish policies or schedules for the addition or removal of resources of the computing resource service provider 802 allocated to the customer 804. The policies may be conditional upon usage statistics or metrics of existing resources that are allocated to the customer 804 and the schedules may be time-based and may reflect pattern on the demand for resources. Further, the automatic scaling service 812 may permit the customer 804 to add or remove resources based on a health check performed on customer-allocated resources.

The computing resource provisioning service 814 may comprise one or more computing resources that collectively configured as a distributed system to provision and update computing resources of the customer 804. The computing resources may be provided by the virtual computer system service 808 or the block-level data storage service 810, among others. One or more declarations may be used to describe the computing resources and any associated dependencies or runtime parameters, whereby the computing resources may be used to run an application.

The computing resource service provider 802 additionally maintains one or more other services 816 based at least in part on the needs of its customers 804. For instance, the computing resource service provider 802 may maintain a database service for its customers 804. A database service may be a collection of computing resources that are collectively configured as a distributed system to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

Figure 9:
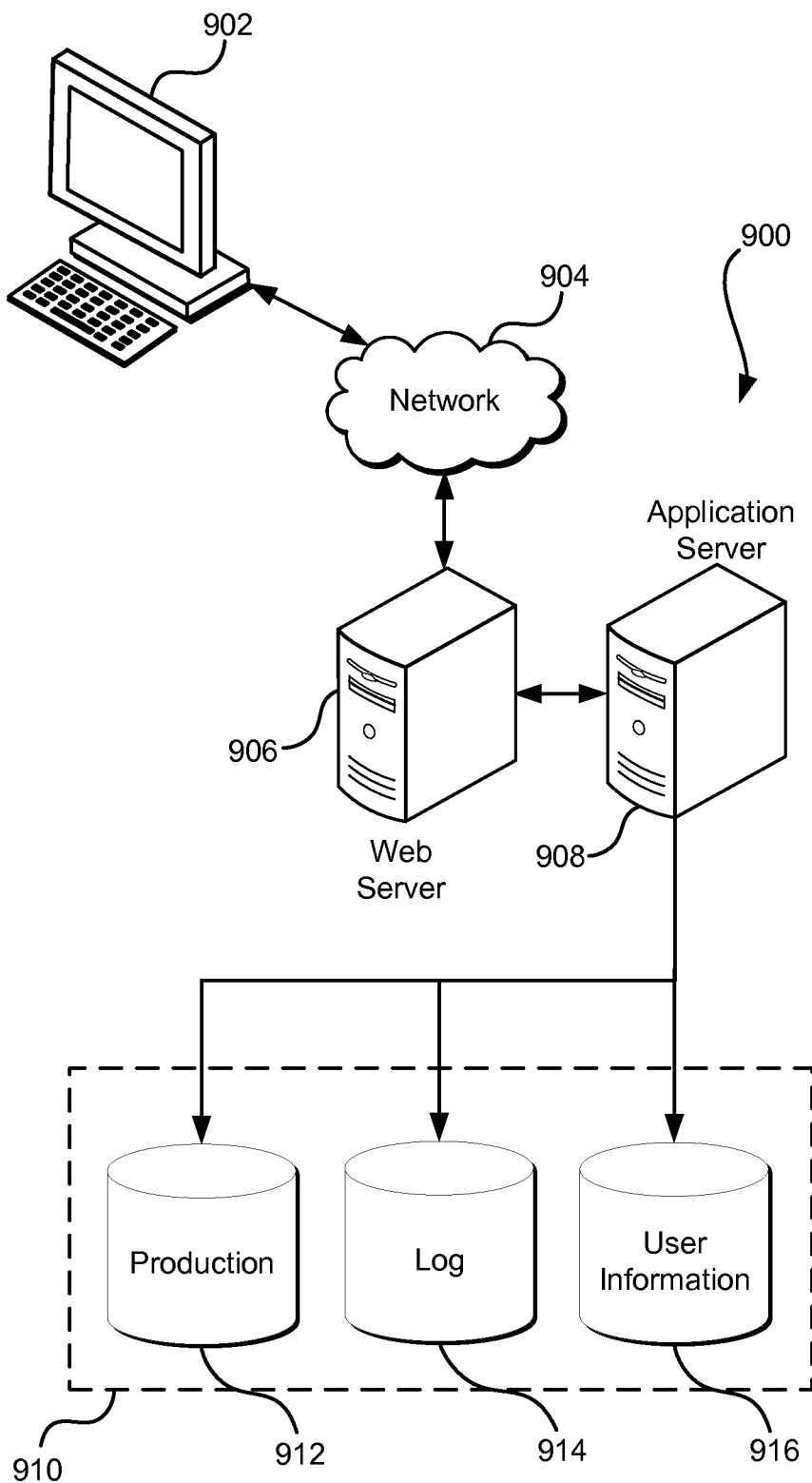
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying, based at least in part on a first declaration of a computing resource associated with a first computing system element executable on at least one virtual computing instance of a plurality of virtual computing instances, a second computing system element executable on the at least one virtual computing instance dependent on the computing resource, wherein the first declaration is a part of an input specification comprising information indicating a set of parameters for an application programming interface (API) request to cause a service to provision the computing resource;
   performing a first health check on the first computing system element using the computing resource provided by the service; and
   performing a second health check on the second computing system element by at least:
      instantiating the second computing system element in accordance with a second declaration associated with the second computing system element; and
      enabling the second computing system element, based at least in part on the second computing system element being dependent on the same computing resource used by the first computing system element to perform the first health check as identified in the first declaration, to access the computing resource provided by the service for the second health check.

2. The computer-implemented method of claim 1, wherein enablement of the second computing system element fails on a condition that the computing resource is not made available for use by the second computing system element.

3. The computer-implemented method of claim 1, wherein the first computing system element is instantiated by at least launching a virtual computer system by a virtual computer system service or launching a data store by a data storage service.

4. The computer-implemented method of claim 1, wherein performing the second health check further includes pinging a port of the second computing system element to determine that the port is available or responsive.

5. A system, comprising:
   memory to store instructions that, as a result of being executed by one or more processors of the system, cause the system to:
      obtain at least a portion of an input specification including a first declaration associated with a first computing system element executable on a virtual computing instance, wherein the first declaration determines a set of parameters for an application programming interface (API) request to cause a service to provision a computing resource to the first computing system element;
      identify, based at least in part on the first declaration, a second computing system element executable on a second virtual computing instance dependent on the computing resource;

perform a first health check on the first computing system element using the computing resource provided by the service; and perform a second health check on the second computing system element by at least:

instantiate the second computing system element in accordance with a second declaration associated with the second computing system element; and enable the second computing system element, based at least in part on the second computing system element being dependent on the computing resource as identified in the first declaration, to access the computing resource provided by the service for the second health check.

6. The system of claim 5, wherein the computing resource associated with the first computing system element is made available for the second computing system element.

7. The system of claim 5, wherein the first health check on the first computing system element is performed independently of the second health check on the second computing system element.

8. The system of claim 5, wherein association between the computing resource and the first computing system element is terminated following the first health check on the first computing system element.

9. The system of claim 5, wherein association between the computing resource and the first computing system element is not terminated following the first health check on the first computing system element on a condition that the first declaration indicates that another computing system element is dependent on the first computing system element.

10. The system of claim 5, wherein the computing resource includes a virtual computer system provided by a virtual computer system service or a data store provided by a data storage service of a computing resource service provider.

11. The system of claim 5, further comprising instructions that, as a result of being executed by the one or more processors of the system, cause the system to generate a report that indicates success or failure of execution of the first and second computing system elements.

12. The system of claim 11, wherein the report is provided to a customer of a computing resource service provider.

13. A non-transitory computer-readable storage medium comprising executable instructions that, as a result of being executed by one or more processors of a computer system, cause the computer system to at least:

identify, based at least in part on a first declaration associated with a first computing system element executable on a virtual computing instance, obtained as a part of an input specification indicating a set of parameters for an application programming interface (API) request to cause a computing resource to be provisioned by a service to the first computing system element, a second computing system element executable on a second virtual computing instance dependent on the computing resource;

perform a first health check on the first computing system element using the computing resource provisioned by service; and perform a second health check on the second computing system element by at least:

instantiate the second computing system element in accordance with a second declaration associated with the second computing system element; and enable the second computing system element, based at least in part on the second computing system element being dependent on the computing resource as identified in the first declaration, to access the computing resource provisioned by the service for the second health check.

14. The non-transitory computer-readable storage medium of claim 13, wherein the first health check on the first computing system element is performed independently of the second health check on the second computing system element.

15. The non-transitory computer-readable storage medium of claim 13, wherein:

the first declaration indicates whether the first computing system element is to be terminated following performing the first health check on the first computing system element; and the instructions further comprise instructions that, as a result of being executed by the one or more processors, cause the computer system to terminate the computing resource associated with the first computing system element in accordance with the first declaration.

16. The non-transitory computer-readable storage medium of claim 13, wherein the computing resource is made available for use by the second computing system element.

17. The non-transitory computer-readable storage medium of claim 13, wherein the computing resource includes at least one of a private subnet or a demilitarized subnet.

18. The non-transitory computer-readable storage medium of claim 13, wherein the second computing system element is not successfully enabled on a condition that the computing resource is not provided for use by the second computing system element.

19. The non-transitory computer-readable storage medium of claim 13, wherein the instructions further comprise instructions that, as a result of being executed by the one or more processors, cause the computer system to generate a report to be emailed, using an email service of a computing resource service provider.

20. The non-transitory computer-readable storage medium of claim 13, wherein the instructions further comprise instructions that, as a result of being executed by the one or more processors, cause the computer system to instantiate a virtual computer system by a virtual computer system service or a data store by a data storage service.

21. The computer-implemented method of claim 1, further comprising:

tracking attributes of the computing resource used by the first computing system element to perform the first health check; and evaluate whether the second computing system element is successfully executed using the tracked computing resource.

22. The computer-implemented method of claim 1, wherein performing the second health check is irrespective of results from the first health check.

* * * * *